(12) United States Patent
Lindholm et al.

(10) Patent No.: US 7,634,637 B1
(45) Date of Patent: Dec. 15, 2009

(54) EXECUTION OF PARALLEL GROUPS OF THREADS WITH PER-INSTRUCTION SERIALIZATION

(75) Inventors: John Erik Lindholm, Saratoga, CA (US); Stuart F. Oberman, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/305,803

(22) Filed: Dec. 16, 2005

(51) Int. Cl.
*G06F 15/76* (2006.01)
*G06F 9/00* (2006.01)

(52) U.S. Cl. .............. 712/22; 712/20; 712/13; 712/229

(58) Field of Classification Search .............. 712/20, 712/22, 13, 229
See application file for complete search history.

(56) References Cited

U.S. PATENT DOCUMENTS

| | | | |
|---|---|---|---|
| 5,481,669 A * | 1/1996 | Poulton et al. | 345/505 |
| 6,151,668 A * | 11/2000 | Pechanek et al. | 712/24 |
| 6,766,437 B1 * | 7/2004 | Coscarella et al. | 712/20 |
| 6,897,871 B1 | 5/2005 | Morein et al. | |
| 6,947,047 B1 * | 9/2005 | Moy et al. | 345/501 |
| 2002/0174318 A1 * | 11/2002 | Stuttard et al. | 712/13 |
| 2004/0181652 A1 * | 9/2004 | Ahmed et al. | 712/215 |
| 2006/0053189 A1 * | 3/2006 | Mantor | 708/490 |

OTHER PUBLICATIONS

Eggers et al. "Simultaneous multithreading: A platform for next-generation processors" IEEE Micro, Sep./Oct. 1997(vol. 17, No. 5) pp. 12-19.

* cited by examiner

*Primary Examiner*—David J Huisman
*Assistant Examiner*—William B Partridge
(74) *Attorney, Agent, or Firm*—Townsend and Townsend and Crew LLP

(57) ABSTRACT

In a processor, a SIMD group (a group of threads for which instructions are issued in parallel using single instruction, multiple data instruction issue techniques) is logically divided into two or more "SIMD subsets," each containing one or more of the threads in the SIMD group. Each SIMD subset is associated with a different instance of a variable state parameter. The processor determines which of the instructions to be executed for the SIMD group rely on the state variable and serializes execution of such instructions so that the instruction is executed separately for each SIMD subset. Instructions that do not rely on the state variable are advantageously not serialized.

16 Claims, 7 Drawing Sheets

EXECUTION OF PARALLEL GROUPS OF THREADS WITH PER-INSTRUCTION SERIALIZATION

BACKGROUND OF THE INVENTION

The present invention relates in general to parallel data processing, and in particular to SIMD instruction execution with multiple-state, multiple-data behavior.

Parallel processing techniques enhance throughput of a processor or multiprocessor system when multiple independent computations need to be performed. A computation can be divided into tasks that are defined by programs, with each task being performed as a separate thread. (As used herein, a "thread" refers generally to an instance of execution of a particular program using particular input data, and a "program" refers to a sequence of executable instructions that produces result data from input data.) Parallel threads are executed simultaneously using different processing engines inside the processor.

Numerous existing processor architectures support parallel processing. The earliest such architectures used multiple discrete processors networked together. More recently, multiple processing cores have been fabricated on a single chip. These cores (or discrete processors) are controlled in various ways. In some instances, known as multiple-instruction, multiple data (MIMD) machines, each core independently fetches and issues its own instructions to its own processing engine (or engines). In other instances, known as single-instruction, multiple-data (SIMD) machines, a core has a single instruction unit that issues the same instruction in parallel to multiple processing engines, which execute the instruction on different input operands. SIMD machines generally have advantages in chip area (since only one instruction unit is needed) and therefore cost; the downside is that parallelism is only available to the extent that multiple instances of the same instruction can be executed concurrently.

Conventional graphics processors use very wide SIMD architectures to achieve high throughput in image-rendering applications. Such applications generally entail executing the same programs (e.g., vertex shaders or pixel shaders) on large numbers of objects (e.g., vertices or pixels). Since each object is processed independently of all others but using the same sequence of operations, a SIMD architecture provides considerable performance enhancement at reasonable cost. In high-end GPUs, multiple SIMD cores are sometimes provided to support an even higher degree of parallelism.

One difficulty with SIMD instruction execution is management of changes in the state information associated with the program to be executed. For instance, the identifier of a primitive to be applied in a pixel shader program, which is typically shared across multiple pixels, is usually supplied as state information. In existing SIMD architectures, an issued instruction is executed for all program instances using the same state parameters. Thus, it is often necessary to break up program instances into multiple separately-executed SIMD groups at points in the input data stream where state parameters change, e.g., each time there is a transition from one primitive to the next in the case of pixel shaders. As a result, the SIMD core may execute two SIMD groups that are less than fully populated instead of one fully-populated group, resulting in inefficient use of the core's resources. In general, the more frequently state parameters change, the greater the resulting inefficiency. Further, as the maximum width (i.e., the number of parallel program instances) of a SIMD group that the processor accommodates increases, the likelihood of a state change—and therefore of the core executing groups that are less than fully populated—increases.

It would therefore be desirable to provide SIMD instruction execution in a manner that allows multiple values of state parameters to coexist within the same SIMD group.

BRIEF SUMMARY OF THE INVENTION

In accordance with an embodiment of the present invention, different threads in a SIMD group (i.e., a group of threads for which instructions are issued in parallel using single-instruction, multiple-data instruction issue techniques) may use different state information. More specifically, the SIMD group may be logically divided into two or more "SIMD subsets," each containing one or more of the threads in the SIMD group. Each SIMD subset is associated with a different value of a variable state parameter (also referred to herein as a state variable). The instruction issue logic of the processor is advantageously configured to determine which instructions rely on the state variable and to serialize execution of such instructions so that the instruction is executed separately for each SIMD subset. In one embodiment, instructions that rely on the state variable are issued multiple times in sequence; each time the instruction is issued, a different value of the state variable and an active mask corresponding to the SIMD subset associated with that value are provided to processing engines that process the instruction. Instructions that do not rely on the state variable can be issued once for the entire SIMD group.

According to one aspect of the present invention, a method for processing data in a parallel processor includes defining a single instruction, multiple data (SIMD) group comprising multiple threads, wherein all of the threads of the SIMD group are executable in parallel. The threads of the SIMD group are divided into two or more SIMD subsets, each SIMD subset being associated with a respective one of a number of instances of a state variable. When an instruction to be executed for the SIMD group is received, a determination is made as to whether the state variable affects execution of the instruction. In the event that the state variable affects execution of the instruction, execution of the instruction is serialized such that threads in each SIMD subset execute the instruction serially relative to threads in each other SIMD subset, wherein threads in each SIMD subset execute the instruction using the instance of the first state variable associated with that SIMD subset. In the event that the state variable does not affect execution of the instruction, the instruction may be executed for all of the SIMD subsets in parallel.

In some embodiments, serializing execution of the instruction includes issuing the instruction in association with a first one of the instances of the state variable for execution by a first one of the SIMD subsets and thereafter issuing the instruction in association with a second one of the instances of the state variable for execution by a second one of the SIMD subsets.

In some embodiments, dividing the threads includes providing a state packet that includes the plurality of instances of the state variable and identifying, in the state packet, the threads of the SIMD group that are in each SIMD subset. A bit mask associated with each instance of the state variable can be used to identify the threads that are in each SIMD subset.

In some embodiments, some state parameters are treated as static state parameters. If a change in a static state parameter is detected during loading of a SIMD group, the SIMD group is advantageously launched prior to updating stored state information to reflect the change in the static state parameter.

According to another aspect of the present invention, a processor includes processing engines and issue logic coupled to the processing engines and configured to issue a SIMD instruction to the processing engines. The processing engines are configured to execute a SIMD group comprising multiple threads using SIMD issue, wherein the threads of the SIMD group are divided into two or more SIMD subsets, each SIMD subset being associated with a respective one of a number of instances of a state variable. The issue logic includes a scheduler configured to determine whether more than one instance of a state variable that affects execution of an instruction to be issued is present in the group of threads and, in the event that more than one instance of the state variable is present, to schedule the instruction for serialized execution for each of the SIMD subsets. For instance, the issue logic may be further configured to issue multiple instances of each instruction scheduled for serialized execution, each instance of the instruction being associated with a different one of the instances of the state variable.

In some embodiments, the processor also includes a state storage area configured to store state packets that contain values of state parameters for the SIMD group. The state packets advantageously include a static state packet configured to store a static state parameter that is guaranteed to be the same for all of the threads of the SIMD group and a dynamic state packet configured to store one or more instances of the state variable.

In some embodiments, the processor also includes thread packing logic configured to load input data for the threads of the SIMD group into the core and further configured to detect and process updates to state parameters including the state variable. The thread packing logic may be further configured to add a new instance of the state variable to the dynamic state packet in the event of an update to the state variable and to update the static state parameter only after launching the SIMD group.

The following detailed description together with the accompanying drawings will provide a better understanding of the nature and advantages of the present invention.

DETAILED DESCRIPTION OF THE INVENTION

In accordance with an embodiment of the present invention, different threads in a SIMD group (i.e., a group of threads for which instructions are issued in parallel using single-instruction, multiple-data instruction issue techniques) may use different state information. More specifically, the SIMD group may be logically divided into two or more "SIMD subsets," each containing one or more of the threads in the SIMD group. Each SIMD subset is associated with a different value of a variable state parameter (also referred to herein as a state variable). The instruction issue logic of the processor is advantageously configured to determine which instructions rely on the state variable and to serialize execution of such instructions so that the instruction is executed separately for each SIMD subset. In one embodiment, instructions that rely on the state variable are issued multiple times in sequence; each time the instruction is issued, a different value of the state variable and an active mask corresponding to the SIMD subset associated with that value are provided to processing engines that process the instruction. Instructions that do not rely on the state variable can be issued once for the entire SIMD group.

System Overview

Figure 1:
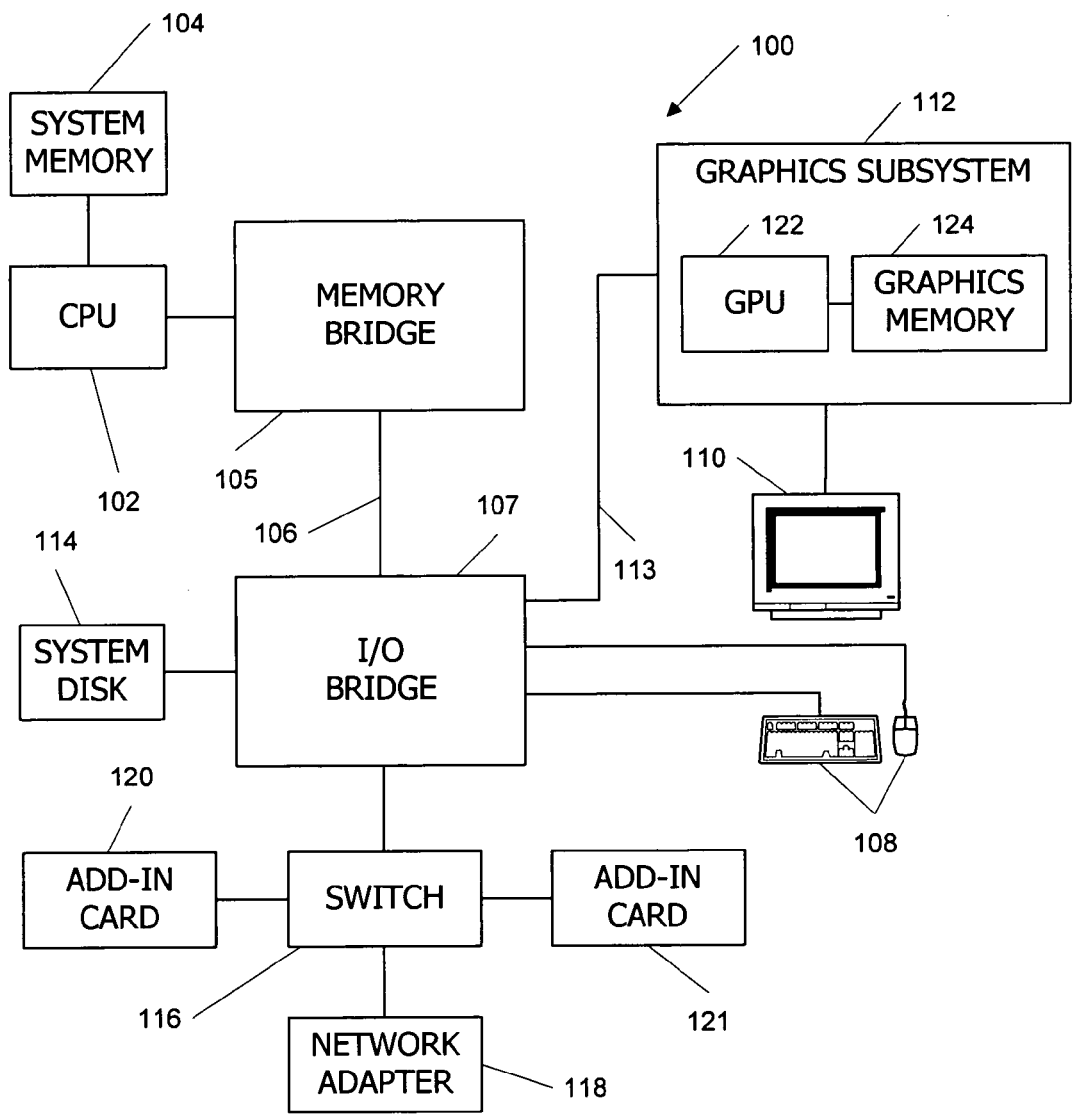
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional cathode ray tube (CRT) or liquid crystal display (LCD) based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, compact disc (CD) drives, digital versatile disc (DVD) drives, and the like, may also be connected to I/O bridge 107. Bus connections among the various components may be implemented using bus protocols such as PCI (Peripheral Component Interconnect), PCI Express (PCI-E), AGP (Accelerated Graphics Port), HyperTransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
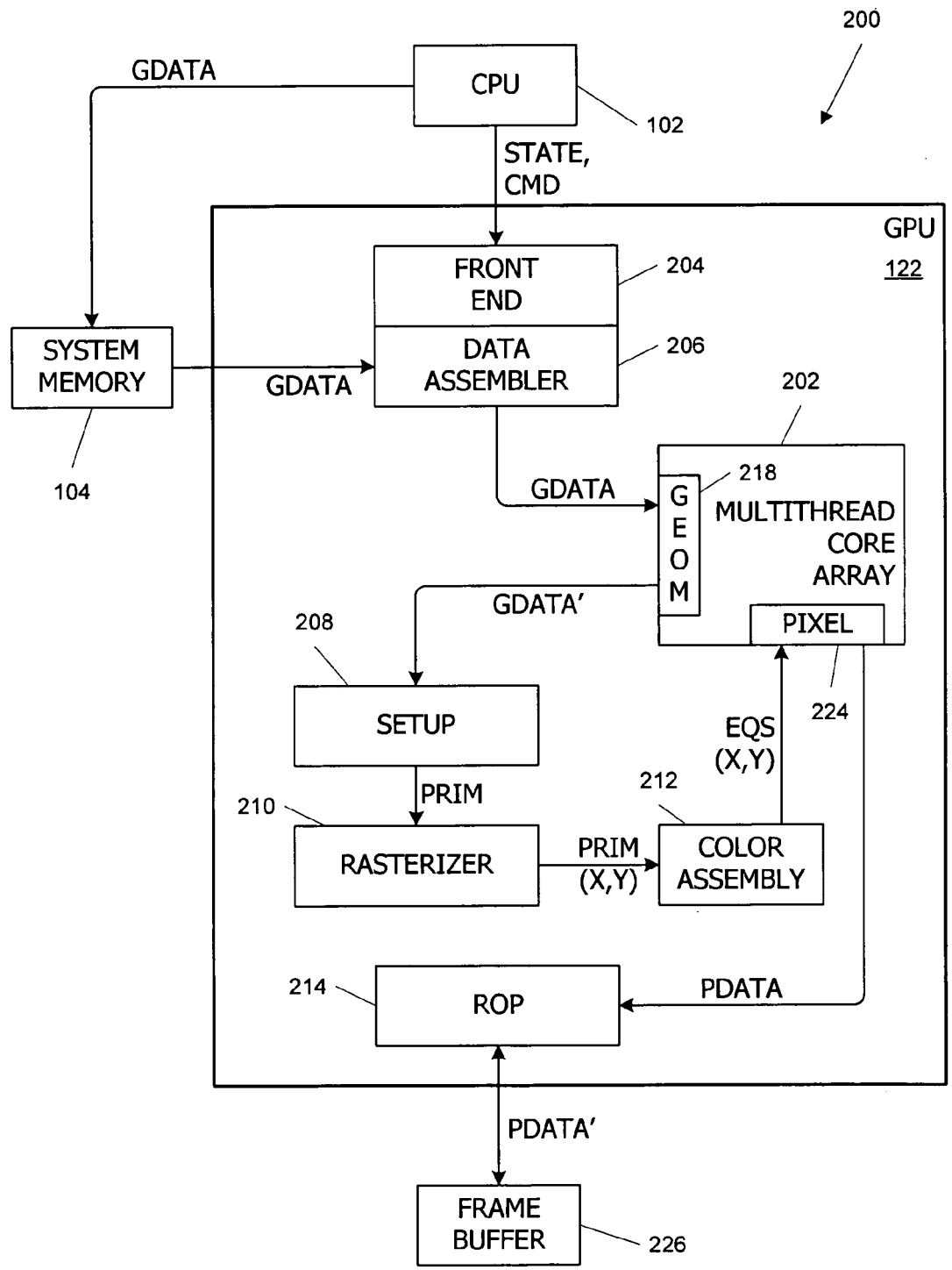
FIG. 2 is a block diagram of a rendering pipeline that can be implemented in the GPU of FIG. 1 according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a pixel shader program to interpolate a value for the attribute at any location within the primitive; conventional techniques can be used to generate the equations. For instance, in one embodiment, color assembly module 212 generates coefficients A, B, and C for a plane equation of the form $U=Ax+By+C$ for each attribute U.

Color assembly module 212 provides the attribute equations (EQS, which may include e.g., the plane-equation coefficients A, B and C) for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

Multithreaded Core Array Configuration

Figure 3:
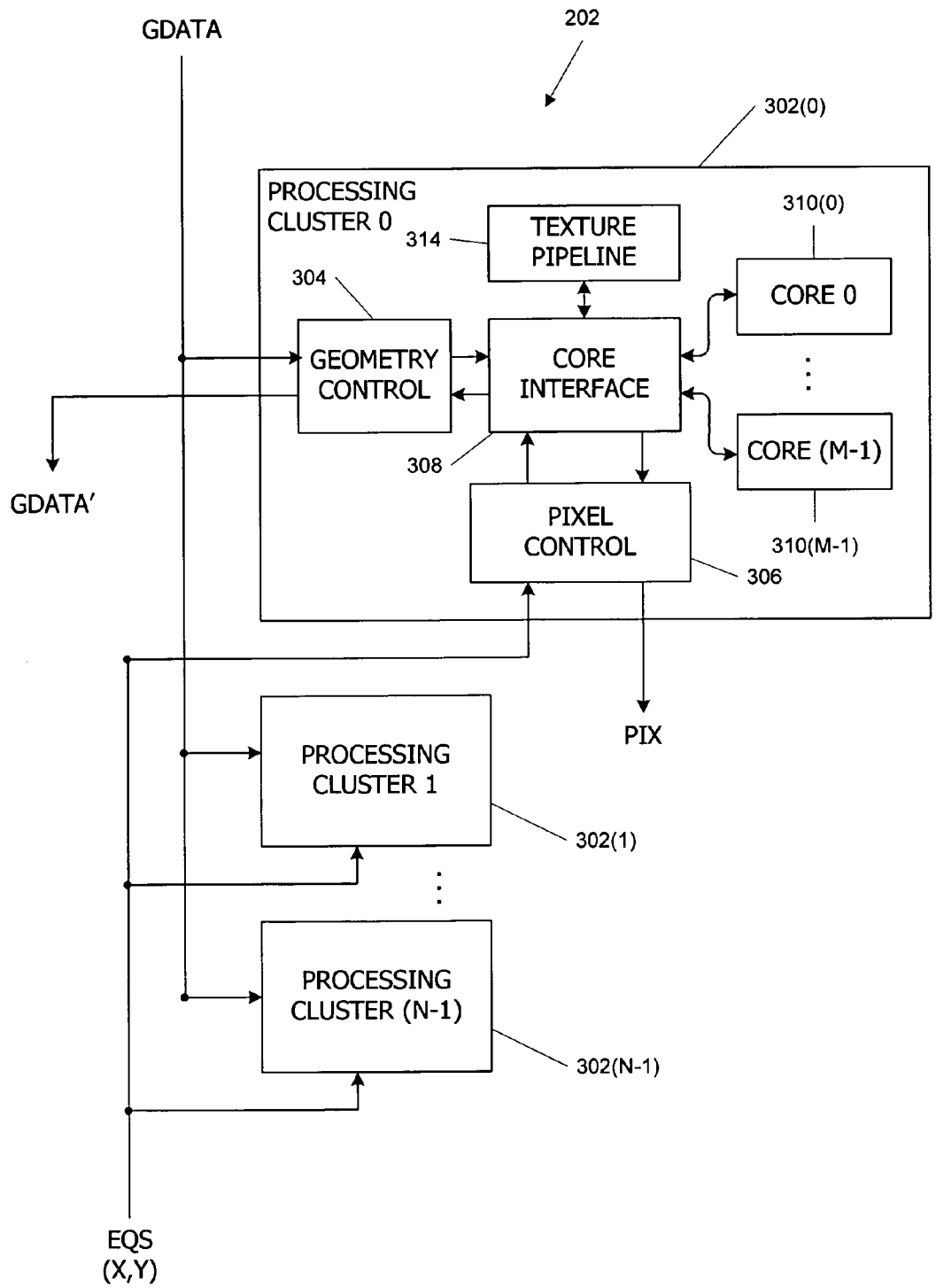
FIG. 3 is a block diagram of a multithreaded core array according to an embodiment of the present invention.

In one embodiment, multithreaded core array 202 provides a highly parallel architecture that supports concurrent execution of a large number of instances of vertex, geometry, and/or pixel shader programs in various combinations. FIG. 3 is a block diagram of multithreaded core array 202 according to an embodiment of the present invention.

In this embodiment, multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads. An example architecture for a representative core 310 is described below with reference to FIG. 4.

Core interface 308 also controls a texture pipeline 314 that is shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308. Texture processing by pipeline 314 may consume a significant number of clock cycles, and while a thread is waiting for the texture result, core 310 advantageously continues to execute other threads.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. Upon completion of the vertex shader program, core interface 308 signals geometry controller 304. If a geometry shader program is to be executed, geometry controller 304 instructs core interface 308 to launch the geometry shader program. In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GDATA') to setup module 208 of FIG. 2.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources or the location of the primitive in screen coordinates, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 310(0) of each processing cluster. Such design choices may be driven by considerations of hardware size and complexity versus performance, as is known in the art. A shared texture pipeline is also optional; in some embodiments, each core might have its own texture pipeline or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it. In still another embodiment, processing clusters are selected based on properties of the input data, such as the screen coordinates of pixels to be processed.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Core Architecture

Figure 4:
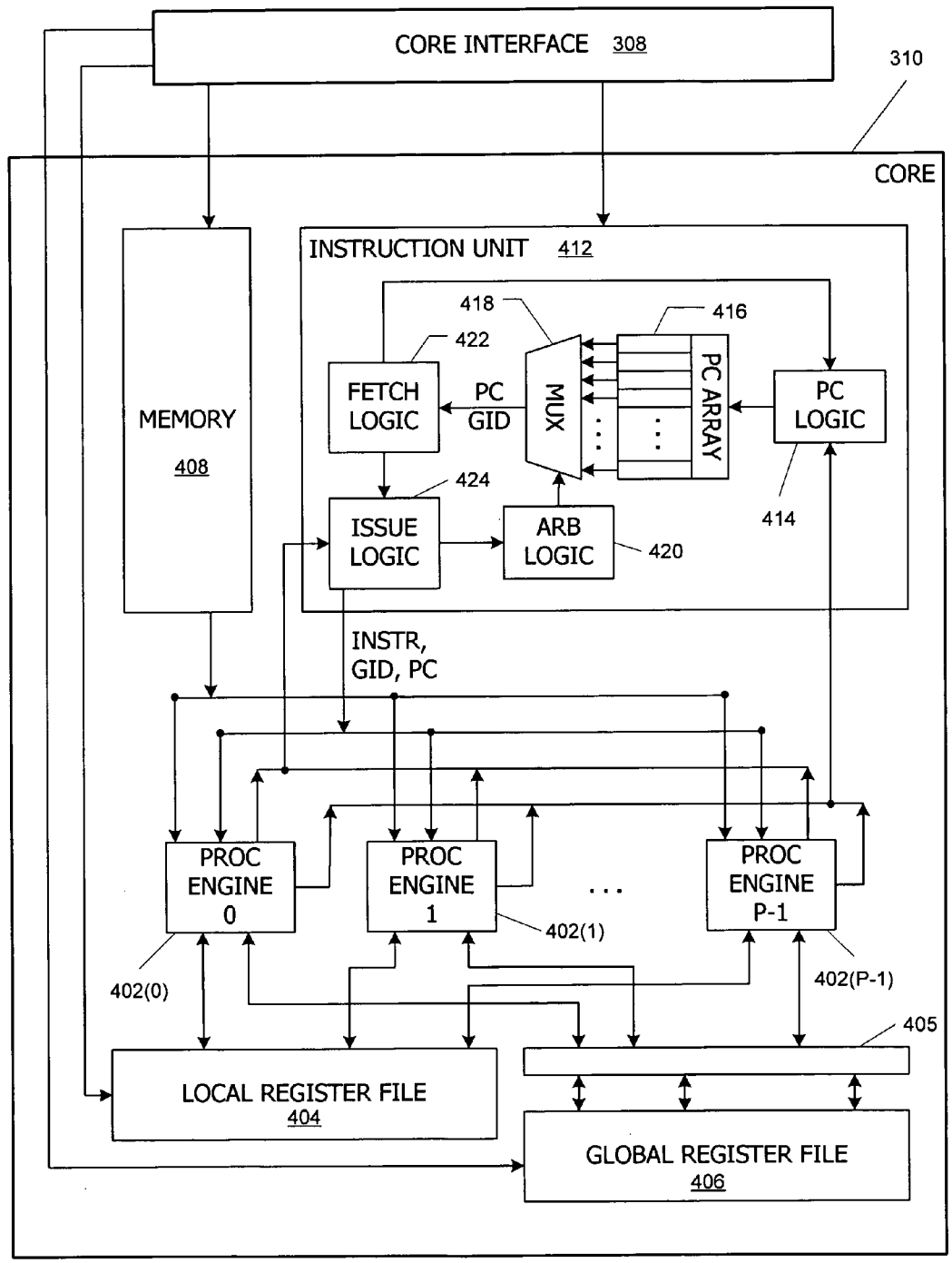
FIG. 4 is a block diagram of a processing core according to an embodiment of the present invention.

FIG. 4 is a block diagram of a core 310 according to an embodiment of the present invention. Core 310 is advantageously configured to execute a large number of threads in parallel, where the term "thread" refers to an instance of a particular program executing on a particular set of input data. For example, a thread can be an instance of a vertex shader program executing on the attributes of a single vertex or a pixel shader program executing on a given primitive and pixel. In some embodiments, single-instruction, multiple-data (SIMD) instruction issue techniques are used to support parallel execution of a large number of threads without providing multiple independent instruction fetch units.

In one embodiment, core 310 includes an array of P (e.g., 16) parallel processing engines 402 configured to receive SIMD instructions from a single instruction unit 412. Each parallel processing engine 402 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 402 is allocated space in a local register file 404 for storing its local input data, intermediate results, and the like. In one embodiment, local register file 404 is physically or logically divided into P lanes, each having some number of entries (where each entry might be, e.g., a 32-bit word). One lane is allocated to each processing unit, and corresponding entries in different lanes can be populated with data for corresponding thread types to facilitate SIMD execution. The number of entries in local register file 404 is advantageously large enough to support multiple concurrent threads per processing engine 402.

Each processing engine 402 also has access, via a crossbar switch 405, to a global register file 406 that is shared among all of the processing engines 402 in core 310. Global register file 406 may be as large as desired, and in some embodiments, any processing engine 402 can read to or write from any location in global register file 406. In addition to global register file 406, some embodiments also provide an on-chip shared memory 408, which may be implemented, e.g., as a conventional RAM. On-chip memory 408 is advantageously used to store data that is expected to be used in multiple threads, such as coefficients of attribute equations, which are usable in pixel shader programs. In some embodiments, processing engines 402 may also have access to additional off-chip shared memory (not shown), which might be located, e.g., within graphics memory 124 of FIG. 1.

In one embodiment, each processing engine 402 is multi-threaded and can execute up to some number G (e.g., 24) of threads concurrently, e.g., by maintaining current state information associated with each thread in a different portion of its allocated lane in local register file 406. Processing engines 402 are advantageously designed to switch rapidly from one thread to another so that, for instance, a program instruction from a vertex thread could be issued on one clock cycle, followed by a program instruction from a different vertex thread or from a different type of thread such as a geometry thread or a pixel thread, and so on.

Instruction unit 412 is configured such that, for any given processing cycle, the same instruction (INSTR) is issued to all P processing engines 402. Thus, at the level of a single clock cycle, core 310 implements a P-way SIMD microarchitecture. Since each processing engine 402 is also multi-threaded, supporting up to G threads, core 310 in this embodiment can have up to P*G threads in flight concurrently. For instance, if P=16 and G=24, then core 310 supports up to 384 concurrent threads.

Because instruction unit 412 issues the same instruction to all P processing engines 402 in parallel, core 310 is advantageously used to process threads in "SIMD groups." As used herein, a "SIMD group" refers to a group of up to P threads of execution of the same program on different input data, with one thread of the group being assigned to each processing engine 402. For example, a SIMD group might consist of P vertices, each being processed using the same vertex shader program. (A SIMD group may include fewer than P threads, in which case some of processing engines 402 will be idle during cycles when that SIMD group is being processed.) Since each processing engine 402 can support up to G threads, it follows that up to G SIMD groups can be in flight in core 310 at any given time.

On each clock cycle, one instruction is issued to all P threads making up a selected one of the G SIMD groups. To indicate which thread is currently active, a "group index" (GID) for the associated thread group may be included with the instruction. Processing engine 402 uses group index GID as a context identifier, e.g., to determine which portion of its allocated lane in local register file 404 should be used when executing the instruction. Thus, in a given cycle, all processing engines 402 in core 310 are nominally executing the same instruction for different threads in the same group. In some instances, an active mask is applied at instruction issue to control which processing engines 402 execute the instruction so that an instruction can be executed in parallel for a subset of the threads in the SIMD group.

Instruction unit 412 includes program counter (PC) logic 414, a program counter register array 416, a multiplexer 418, arbitration logic 420, fetch logic 422, and issue logic 424. Program counter register array 416 stores G program counter values (one per SIMD group), which are updated independently of each other by PC logic 414. PC logic 414 updates the PC values based on information received from processing engines 402 and/or fetch logic 422. PC logic 414 is advantageously configured to track divergence among threads in a SIMD group and to select instructions in a way that ultimately results in the threads resynchronizing.

Fetch logic 422, which may be of generally conventional design, is configured to fetch an instruction corresponding to a program counter value PC from an instruction store (not shown) and to provide the fetched instructions to issue logic 424. In some embodiments, fetch logic 422 (or issue logic 424) may also include decoding logic that converts the instructions into a format recognizable by processing engines 402.

Arbitration logic 420 and multiplexer 418 determine the order in which instructions are fetched. More specifically, on each clock cycle, arbitration logic 420 selects one of the G possible group indices GID as the SIMD group for which a next instruction should be fetched and supplies a corresponding control signal to multiplexer 418, which selects the corresponding PC. Arbitration logic 420 may include conventional logic for prioritizing and selecting among concurrent threads (e.g., using round-robin, least-recently serviced, or the like), and selection may be based in part on feedback information from fetch logic 422 or issue logic 424 as to how many instructions have been fetched but not yet issued for each SIMD group.

Fetch logic 422 provides the fetched instructions, together with the group index GID and program counter value PC, to issue logic 424. In some embodiments, issue logic 424 maintains a queue of fetched instructions for each in-flight SIMD group. Issue logic 424, which may be of generally conventional design, receives status information from processing engines 402 indicating which SIMD groups are ready to execute a next instruction. Based on this information, issue logic 424 selects a next instruction to issue and issues the selected instruction, together with the associated PC value and GID. Each processing engine 402 either executes or ignores the instruction, depending on an active mask associated with the group index GID. In one embodiment, the active mask reflects the presence or absence of idle threads in the SIMD group, possible divergence in the execution paths taken by different threads in the SIMD group, and/or serialization of execution of different subsets of the SIMD group based on differences in state parameters as described below.

In one embodiment, instructions within a SIMD group are issued in order relative to each other, but the next instruction to be issued can be associated with any one of the SIMD groups. For instance, if in the context of one SIMD group, one or more processing engines 402 are waiting for a response from other system components (e.g., off-chip memory or texture pipeline 314 of FIG. 3), issue logic 424 advantageously selects a group index GID corresponding to a different SIMD group.

For optimal performance, all threads within a SIMD group are advantageously launched on the same clock cycle so that they begin in a synchronized state. In one embodiment, core interface 308 advantageously loads a SIMD group into core 310, then instructs core 310 to launch the group. "Loading" a group includes supplying instruction unit 412 and processing engines 402 with input data and other parameters required to execute the applicable program. For example, in the case of vertex processing, core interface 308 loads the starting PC value for the vertex shader program into a slot in PC array 416 that is not currently in use; this slot corresponds to the group index GID assigned to the new SIMD group that will process vertex threads. Core interface 308 allocates sufficient space for an input buffer (e.g., in global register file 406 or local register file 404) for each processing engine 402 to execute one vertex thread, then loads the vertex data. In one embodiment, all data for the first vertex in the group is loaded into a lane of the input buffer allocated to processing engine 402(0), all data for the second vertex is in a lane of the input buffer allocated to processing engine 402(1), and so on. In some embodiments, data for multiple vertices in the group can be loaded in parallel, as described below.

Once all the data for the group has been loaded, core interface 308 launches the SIMD group by signaling to instruction unit 412 to begin fetching and issuing instructions corresponding to the group index GID of the new group. SIMD groups for geometry and pixel threads can be loaded and launched in a similar fashion. Examples of loading and launching logic for various types of threads are described below.

It should be noted that although all threads within a group are executing the same program and are initially synchronized with each other, the execution paths of different threads in the group might diverge during the course of program execution. Instruction unit 412 advantageously manages instruction fetch and issue for each SIMD group so as to ensure that threads in a group that have diverged eventually resynchronize. For instance, in one embodiment, instruction unit 412 maintains a branch token stack for each SIMD group. If a branch is taken by some threads in a SIMD group ("taken threads") but not by others ("not-taken threads"), a token is pushed onto the SIMD group's branch token stack. The token includes a mask identifying the not-taken threads. Instruction unit 412 continues to fetch instructions for the taken threads; these instructions are issued to all processing engines 402 with an active mask set such that the instructions are executed for the taken threads but not for the not-taken threads. Execution of the taken threads continues until a point in the instruction stream at which the branch-taken path and the branch-not-taken path merge. The merge point can be identified, e.g., by a flag or other indicator associated with the instruction where the merge occurs.

Once the merge point is reached, instruction unit 412 pops the token off the branch token stack and begins fetching instructions for the not-taken threads; these instructions are issued to all processing engines 402 with the active mask set such that the instructions are executed for not-taken threads but not for taken threads. Execution of the not-taken threads continues until the merge point is reached. Thereafter, the taken and not-taken active masks are merged into a single active mask, and fetching and executing continues.

It will be appreciated that the processing core architecture described herein is illustrative and that variations and modifications are possible. Any number of processing units may be included. In some embodiments, each processing unit has its own local register file, and the allocation of local register file entries per thread can be fixed or configurable as desired.

In some embodiments, core 310 is operated at a higher clock rate than core interface 308, allowing the streaming processor to process more data using less hardware in a given amount of time. For instance, core 310 can be operated at a clock rate that is twice the clock rate of core interface 308. If core 310 includes P processing engines 402 producing data at twice the core interface clock rate, then core 310 can produce 2*P results per core interface clock. Provided there is sufficient space in local register file 404, from the perspective of core interface 308, the situation is effectively identical to a core with 2*P processing units. Thus, P-way SIMD parallelism could be produced either by including P processing units in core 310 and operating core 310 at the same clock rate as core interface 308 or by including P/2 processing units in core 310 and operating core 310 at twice the clock rate of core interface 308. Other timing variations are also possible.

In another alternative embodiment, SIMD groups containing more than P threads ("supergroups") can be defined. A supergroup is defined by associating the group index values of two (or more) of the SIMD groups (e.g., GID1 and GID2) with each other. When issue logic 424 selects a supergroup, it issues the same instruction twice on two successive cycles: on one cycle, the instruction is issued for GID1, and on the next cycle, the same instruction is issued for GID2. Thus, the supergroup is in effect a SIMD group. Supergroups can be used to reduce the number of distinct program counters, state definitions, and other per-group parameters that need to be maintained without reducing the number of concurrent threads.

Management of State Information

SIMD groups advantageously use state information in addition to input data to control program execution. State information typically includes various processing parameters that change slowly enough that several threads can be expected to execute using the same set of state parameters. State parameters are advantageously loaded into state registers or other shared memory accessible to instruction unit 424 as well as processing engines 402.

For instance, the starting program counter that defines the shader program to be executed is advantageously handled as a state parameter, since it is usually expected that a large number of threads will be processed using the same shader program. In the context of pixel shaders, attribute coefficients or other data defining the primitive to be processed may also be handled as state information; as described below, the attribute coefficients for each primitive can be loaded into shared memory 408 of core 310, and the state information for each primitive may include a pointer or other reference to the location in shared memory 408 where the primitive is stored. Bindings, or associations, between textures referred to in a shader program and texture data stored in memory may also be handled as state information.

It is possible to operate core 310 with the requirement that all threads in a SIMD group use the same state information. Where this is the case, each state update requires that any groups that are partially loaded when the state update arrives be launched without being fully populated. As long as state changes are relatively infrequent, the loss in throughput is relatively small; however, frequent state changes may result in significant inefficiency.

In accordance with an embodiment of the present invention, different threads in a SIMD group may use different state information. More specifically, the SIMD group may be logically divided into two or more "SIMD subsets," each containing one or more of the threads in the SIMD group. Each SIMD subset is associated with a different value of some item of state information. Instruction issue logic 424 of FIG. 4 is advantageously configured to determine which instructions rely on the state variable and to serialize execution of the instruction such that the instruction is executed separately for each SIMD subset. In one embodiment, instruction issue logic 424 issues such instructions multiple times in sequence; each time the instruction is issued, a different value of the relevant item of state information and an active mask corresponding to the SIMD subset associated with that value are provided to processing engines 402. Any instructions that do not rely on any items of state information for which multiple values coexist in the SIMD group can be executed in parallel for all threads of the SIMD group.

The following sections describe an embodiment of the invention in the context of a pixel shader (PS). Those of ordinary skill in the art with access to the present teachings will recognize that the invention can also be applied to manage state variables for other types of processing tasks.

Quad Packing for Pixel Shader Execution

In one embodiment of the present invention, the input data for a pixel shader program includes the (X, Y) screen coordinates of the pixel, a coverage mask indicating which of several (e.g., 4, 8, 16, etc.) sample locations within the pixel are covered by a primitive, and "centroid" coordinates identifying one or more positions within the pixel at which attribute values are to be computed. The pixel shader program also uses attribute interpolation equations (e.g., attribute coefficients A, B and C as described above) of the primitive. These equations are generally shared across all pixels covered by a given primitive and are advantageously treated as state information rather than input data.

More specifically, in one embodiment, a single copy of the attribute equations (e.g., attribute coefficients) is stored as shared data in a location (e.g., shared memory 408 or global register file 406 shown in FIG. 4) that is accessible to all processing engines 402 during execution of the PS threads. In some embodiments, the state information for each SIMD group advantageously includes a reference (e.g., a pointer) to the location where the attribute coefficients are stored, and the coefficients are accessed as needed during program execution.

Figure 5:
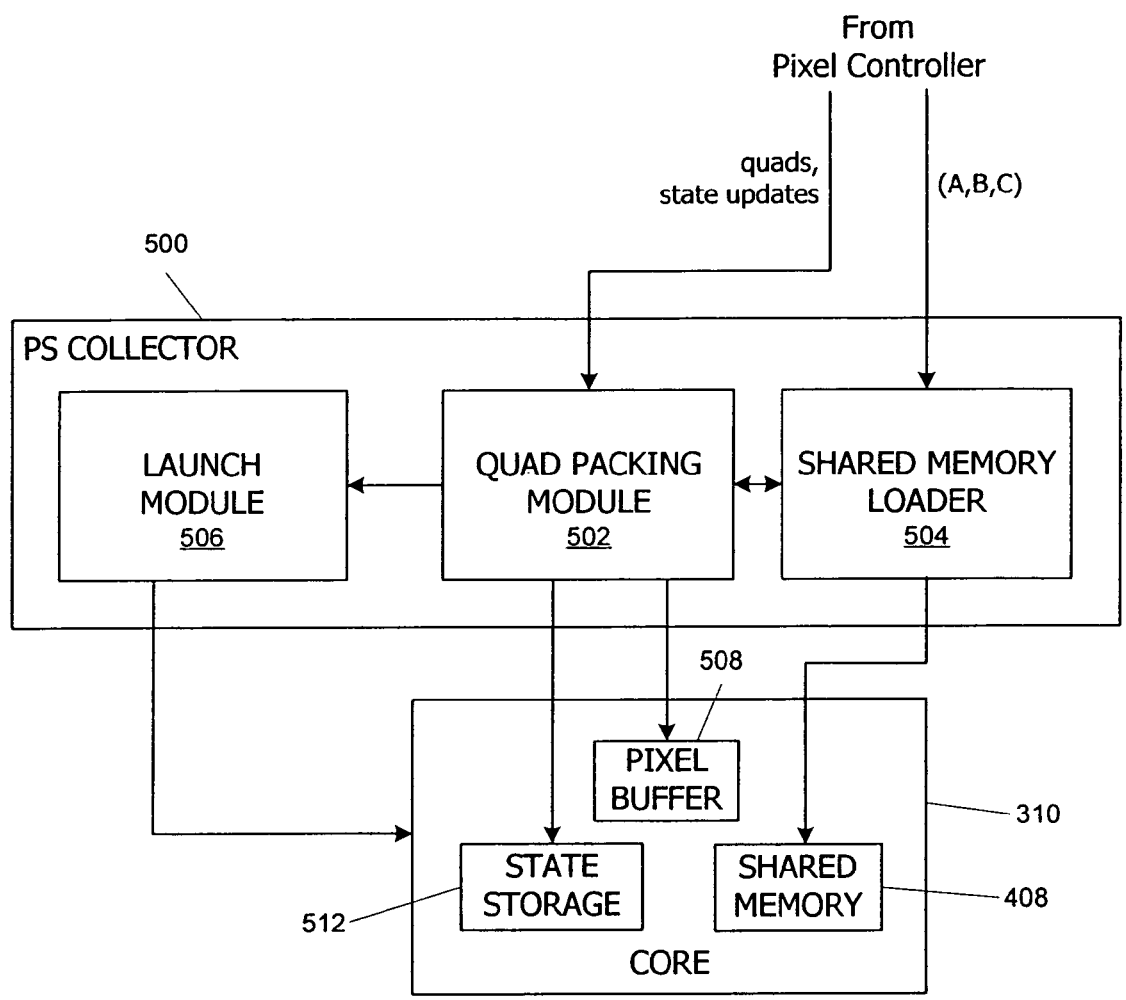
FIG. 5 is a block diagram showing a collector for pixel shader input data according to an embodiment of the present invention.

FIG. 5 is a block diagram showing a pixel shader (PS) collector 500 according to an embodiment of the present invention. PS collector 500 is advantageously implemented in core interface 308 of FIG. 3 and can be used to load PS threads into one or more cores 310. PS collector 500 includes a quad packing module 502, a shared memory loader 504, and a PS launch module 506. For purposes of describing the present invention, only one core 310 is shown in FIG. 5, but it is to be understood that PS collector 500 may communicate with multiple cores 310. In one embodiment, core interface 308 includes a resource allocation unit (not shown in FIG. 5) that monitors the available resources in each core 310 and selects a core 310 to execute each incoming group of PS threads based on availability of resources.

In this embodiment, pixel controller 306 of FIG. 3 delivers pixel data to quad packing module 502 in "quads," where a quad is a 2×2 array of pixels. Data for one quad may be delivered all at once or over successive cycles, and all data for a first quad is advantageously delivered before any data for the next quad.

Since each pixel is to be processed in a separate thread, PS collector 500 collects data for P/4 quads (P pixels) to fully populate a SIMD group. Where P is a multiple of 4 (e.g., 16 or 32), quads are advantageously not divided between SIMD groups, which simplifies the implementation but is not required. In one embodiment, incoming quads are collected in a buffer (not explicitly shown) in quad packing module 502 and are loaded into a pixel buffer 508 in core 310 when the SIMD group is ready to launch. In an alternative embodiment, incoming quads are loaded directly into pixel buffer 508. Pixel buffer 508 can be allocated in local register file 404 or global register file 406 of FIG. 4 as desired. Alternatively, each processing engine 402 may have a small local memory that is usable as pixel buffer 508.

Pixel controller 306 also delivers attribute coefficients (A, B, and C) to shared memory loader 504. Attribute coefficients are advantageously provided once per primitive, regardless of the number of pixels (or quads) the primitive covers, and shared memory loader 504 stores the attribute coefficients for each primitive into shared memory 408 in each core 310 to which quad packing module 502 can deliver input data, so that the attribute coefficients are available for any SIMD groups associated with that primitive. Operation of shared memory loader 504 is not critical to the present invention, and a detailed description is omitted.

PS launch module 506 determines when a SIMD group of PS threads is ready to launch and initiates the execution of the SIMD group by core 310. In one embodiment, PS launch module 506 detects various signals that are generated by quad packing module 502 when a new SIMD group is ready to launch (examples of events that trigger such signals are described below). If a group is ready to launch, PS launch module 506 launches (i.e., instructs core 310 to initiate execution of) the SIMD group and resets quad packing module 502 so that it can begin loading data for the next SIMD group. Operation of PS launch module 506 is also not critical to the present invention, and a detailed description is omitted.

Quad packing module 502 also receives state information including state updates from pixel controller 306. Based on the received state information, state parameters for each SIMD group are loaded into a state storage area 512 in core 310 prior to launching of the SIMD group. State storage area 512 may be implemented using any type of fast-access storage device, such as register files. State information is advantageously structured as one or more "state packets," each of which may contain one or more items of state information (also referred to herein as "state parameters"). In some embodiments, some state packets are classified as "static," meaning that the state parameter(s) therein are guaranteed to have the same value for all threads in a SIMD group, while other state packets are classified as "dynamic," meaning that the packet may contain multiple values of a state parameter, each value being applicable to a different subset of the threads in the SIMD group.

Figure 6:
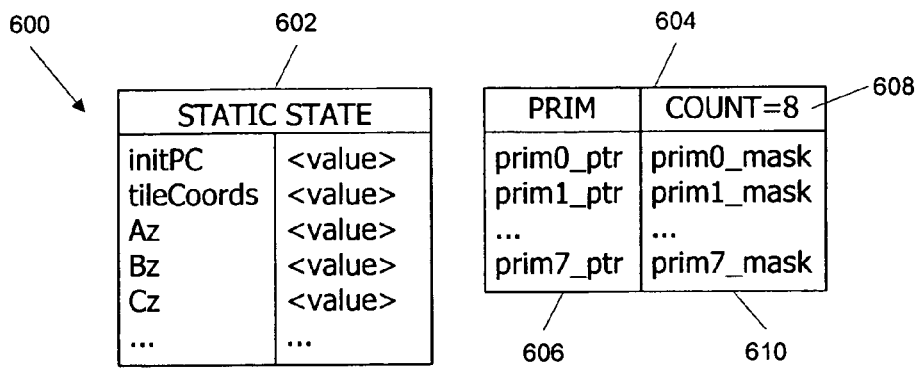
FIG. 6 is a diagram illustrating a state information data structure for a SIMD group according to an embodiment of the present invention.

FIG. 6 illustrates a state information data structure 600 for a SIMD group according to an embodiment of the present invention. State information data structure 600 includes a static state packet 602 and a dynamic state packet 604. Static state packet 602 includes one or more "static" state parameters whose values are guaranteed to be the same for all threads in the SIMD group. In the example shown herein, the static state parameters include an initial program counter (initPC), and coordinates in screen space of the tile to which the quads belong (tileCoords). In embodiments where the attribute coefficients for depth (Az, Bz, Cz) are computed separately for each tile, the static state parameters advantageously also include depth attribute coefficients (Az, Bz, Cz). It is to be understood that other static state parameters may be included in static state packet 602 in addition to or instead of those shown herein. Further, while one static state packet 602 is shown, multiple such packets may be used, with each packet storing one or more static state parameters.

A dynamic state packet 604 is provided for each state parameter that is not necessarily the same for all threads in the SIMD group; such parameters are referred to herein as "state variables" or "dynamic state parameters." In the example shown herein, dynamic state packet 604 defines a state variable "PRIM" that identifies the primitive(s) used in the SIMD group. Dynamic state packet 604 advantageously includes one or more instances 606 of the state variable along with a "count" parameter 608 that indicates the number of instances of the state variable present in dynamic state packet 604. In this example, each instance 606 of the PRIM state variable is a pointer to attribute coefficients for a primitive stored in shared memory 408 (see FIG. 5); each pointer advantageously points to a different primitive. Each pointer instance 606 has a corresponding bit mask 610 indicating which threads of the SIMD group are associated with that pointer instance 606. The bit mask may be of a generally conventional nature: each bit is associated with a different thread, and the bit is set to the logic high state if the thread is associated with the corresponding instance and to the logic low state otherwise. In one embodiment, bit mask 610 is implemented at quad (four-thread) granularity rather than per-thread.

Although only one dynamic state packet 604 is shown in FIG. 6, it is to be understood that any number of dynamic state parameters may be supported, and each such parameter may be stored in a different dynamic state packet. Other examples of dynamic state parameters in the context of a pixel shader program might include the tile coordinates (or other tile identifier), allowing a SIMD group to include quads from multiple tiles. Depth attribute coefficients computed on a per-tile basis might also be implemented as dynamic, rather than static, state parameters. Changes in texture bindings (e.g., associations between texture data and texture identifiers used in the pixel shader program) may also be managed using dynamic state parameters. Various constants that may change from time to time (e.g., fog parameters, scaling factors, etc.) may also be managed as dynamic state parameters.

State information data structure 600 may include a separate dynamic state packet 604 for each state parameter that can be variable within a SIMD group. As described below, in some embodiments, instances of the state variable are dynamically added to dynamic state packet 604 as state changes are detected during SIMD group loading. It is to be understood that if a state variable happens not to change during loading of a SIMD group, then just one instance of the state variable would be present in dynamic state packet 604. In some embodiments, two or more instances of the state variable may have the same value, e.g., if the state variable's value changes and then reverts to its previous value while the SIMD group is being loaded.

It will be appreciated that state information data structure 600 is illustrative and that variations and modifications to the data format and arrangement are possible. A "state packet" as used herein may encompass any data structure capable of storing one or more parameter values, and any number of state packets may be used to store state information. In some embodiments, the size of a dynamic state packet is fixed at the maximum number of instances of the state variable that are allowed in a SIMD group. This maximum number may be less than or equal to the number of threads (or quads) in the group. The count parameter indicates how many of the instances are in use. In other embodiments, the size of a dynamic state packet is variable, with the count parameter indicating the size of the packet as well as the number of instances contained therein.

In still other embodiments, multiple versions of a state vector are stored in shared memory 408 or elsewhere in processing core 310. Each version might be different in one or more state parameters. For each SIMD group, an array of pointers to state vector versions is provided, and each pointer is associated with a bit mask identifying the threads in the SIMD group to which the pointer applies. This arrangement provides maximum flexibility in allowing multiple instances of different state parameters to coexist but introduces additional overhead in determining the actual state information and in determining which SIMD groups actually have multiple instances of a state parameter.

Figure 7:
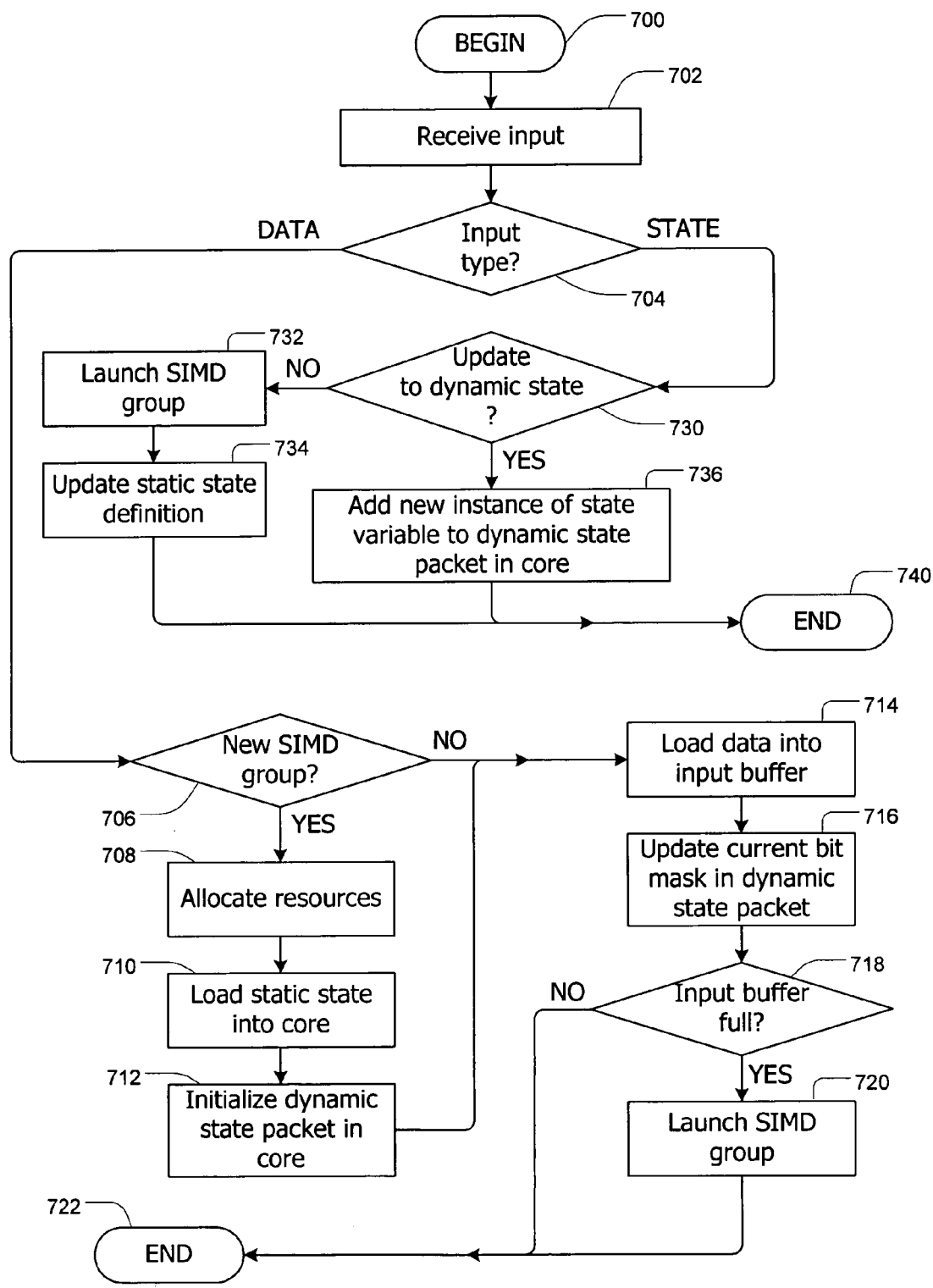
FIG. 7, a flow diagram illustrating operation of the quad packing module of FIG. 5 according to an embodiment of the present invention.

Loading of state parameters into state information data structure 600 will now be described with reference to FIG. 7, a flow diagram illustrating operation of quad packing module 502 of FIG. 5 according to an embodiment of the present invention. A cycle begins (step 700) when quad packing module 502 receives input, at step 702, from pixel controller 306. The input may include either input data for a quad or an update to a state parameter. At step 704, quad packing module 502 determines whether the input includes quad data or a state update.

If the input includes quad data, quad packing module 502 proceeds to step 706 to determine whether the quad data is the first quad data for a new SIMD group. If so, then at step 708, various processing resources in core 310 (e.g., space for pixel buffer 508, space in state storage area 512, etc.) are allocated. At step 710, the current values of any static state parameters are loaded into a static state packet 602 (see FIG. 6) in state storage area 512. At step 712, a dynamic state packet 604 is initialized in state storage area 512 for each state variable. Dynamic state packet 604 is advantageously initialized to store a single instance of the state variable; the value stored is the current value of the state variable, and the associated bit mask is initialized such that no threads of the SIMD group are associated with the stored instance.

For the first quad and each subsequent quad in a SIMD group, quad packing module 502 loads the data into pixel buffer 508. (In some embodiments, the quad data is loaded into a temporary buffer in quad packing module 502 and transferred to pixel buffer 508 when the SIMD group is ready to be launched.) At step 716, the bit mask associated with the current instance of the state variable in dynamic state packet 604 is updated to associate the threads (or quad) being loaded with the current instance of the state variable. At step 718, if the SIMD group is full (i.e., if all quads have been fully populated with input data), quad packing module 502 signals launch module 506 (step 720) that the group is ready to be launched, and launch module 506 responds to the signal by launching the SIMD group. The cycle ends at step 722; thereafter, quad packing module 502 advantageously returns to step 700 to begin a new cycle.

Referring again to step 704, if the input data includes a state update, then quad packing module 502 proceeds to step 730 to determine whether the update is to a static state parameter or a dynamic state parameter (state variable). It is to be understood that either type of state parameter may be updated on any cycle, regardless of the number of quads that have been loaded at that point. If the update is to a static state parameter, then at step 732, quad packing module 502 signals launch module 506 that the SIMD group is ready to be launched (even if it is not fully populated), and launch module 506 responds to the signal by launching the SIMD group. Where the SIMD group is not fully populated, an active mask is advantageously provided to core 310 to disable execution of any instructions for any threads that do not have input data to process, as described above with reference to FIG. 4. The cycle ends at step 740; thereafter, quad packing module 502 advantageously returns to step 700 to begin a new cycle.

If, at step 730, the update is to a dynamic state parameter (state variable), then it is not necessary to launch the SIMD group. Instead, at step 736, quad packing module 502 adds a new instance of the state variable to dynamic state packet 604 in state storage area 312. The new instance has the updated value, and the associated bit mask is initialized such that no threads of the SIMD group are associated with the new instance. In some embodiments, adding the new instance includes incrementing count parameter 608. The new instance becomes the current instance for subsequent updates to the bit mask at step 716 described above. The cycle ends at step 740; thereafter, quad packing module 502 advantageously returns to step 700 to begin a new cycle.

In this embodiment, if the state variable reverts to a previous value during loading of a SIMD group, quad packing module 502 would still create a new instance of the state variable at step 736. In an alternative embodiment, quad packing module 502 detects reversion of the state variable (e.g., by comparing the updated value to any instances currently stored in dynamic state packet 604). If reversion is detected, rather than creating a new instance, quad packing module 502 can revert to using the appropriate previously stored instance as the current instance.

It should also be noted that if an update to a dynamic state parameter is received at a time when the dynamic state packet has not been initialized (e.g. before any input data for a new SIMD group is received), quad packing module 502 may simply overwrite its current value for the state variable with the new value.

It will be appreciated that the quad packing operation described herein is illustrative and that variations and modifications are possible. Steps described as sequential may be executed in parallel, order of steps may be varied, and steps may be modified or combined. In some embodiments, the number of instances of a state variable that may be stored in a dynamic state packet is limited to a maximum number that is less than the number of threads or quads in the SIMD group (e.g., there might be eight quads in a SIMD group while the maximum number of instances is two or four). Where this is the case, once the maximum number of instances of the state variable has been reached, any further updates to the state variable will result in the SIMD group being launched (even if it is not fully populated) before the update takes effect.

In some embodiments, the number of dynamic state parameters may be limited. For instance, only one dynamic state parameter per SIMD group might be supported; as will be seen below, this limitation can simplify the instruction scheduling logic. In one embodiment of this type, the dynamic state parameter is predetermined; for instance, changes in the primitive might be managed as dynamic state parameters while all other parameters are managed as static state parameters. In another embodiment of this type, quad packing module 502 maintains a list of state parameters that might be managed dynamically. The first parameter on the list that is updated during loading of a SIMD group is thereafter treated as the sole dynamic state parameter for that group, and all other parameters (whether on the list or not) are treated as static state parameters.

Execution of Threads with Dynamic State Parameters

Once a SIMD group is launched, core 310 (see FIG. 4) begins fetching and executing instructions for the group. In accordance with an embodiment of the present invention, issue logic 424 receives the fetched instructions for the SIMD group and schedules the instructions for execution. "Scheduling" as used herein refers generally to a process that determines when to issue instructions to the processing engines for execution. Scheduling processes may employ one or more scheduling algorithms that take into account such considerations as initiation or completion of previous instructions in the program sequence, availability of source operands for an instruction to be executed, availability of particular functional units within the processing engines capable of executing the instruction, and so on.

In an aspect relevant to the present invention, a scheduling algorithm determines whether execution of an instruction is to be serialized. As used herein, instruction execution is "serialized" when the same instruction is executed separately for different SIMD subsets within one SIMD group.

Figure 8:
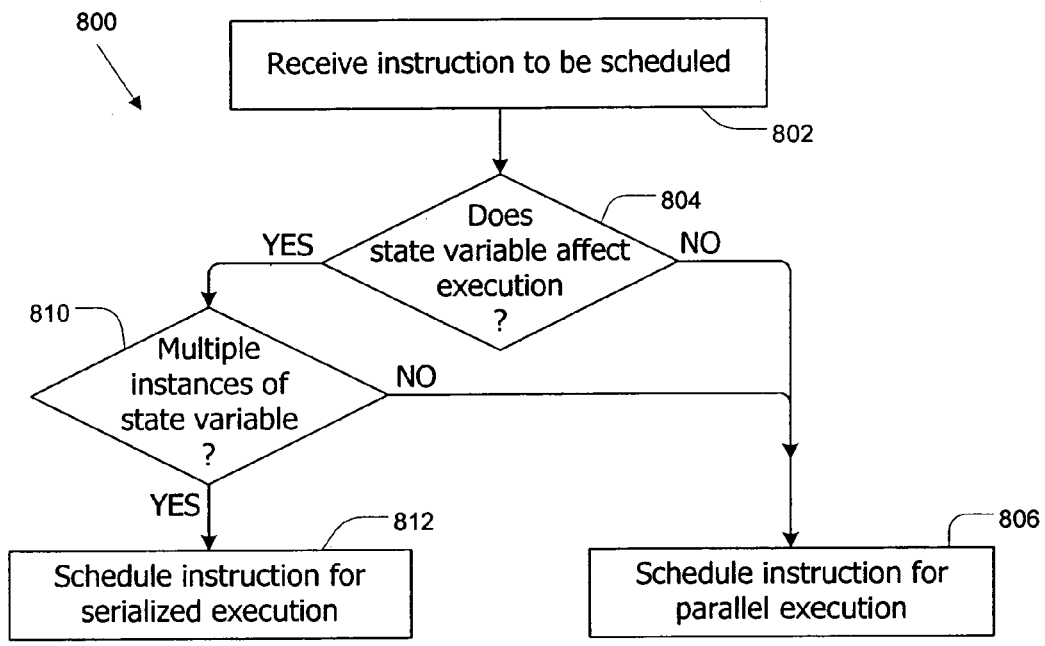
FIG. 8 is a flow diagram of a process implementing a scheduling algorithm according to an embodiment of the present invention.

FIG. 8 is a flow diagram of a process 800 implementing a scheduling algorithm according to an embodiment of the present invention. At step 802, an instruction to be scheduled is received. At step 804, a determination is made as to whether a state variable will affect execution of the instruction.

Those skilled in the art will recognize that many state variables affect execution of some but not all instructions. For instance, execution of register-to-register arithmetic instructions would not be affected by a state variable. Execution of instructions that access attribute data (e.g., attribute interpolation instructions) would be affected by a change in the primitive pointer described above since the primitive pointer is used to determine where to obtain the attribute data; execution of instructions that do not access attribute data would not be affected. Execution of instructions that access a constant stored as state information would be affected by changes in that constant. Other examples will be apparent to those skilled in the art. It should be noted that execution of instructions that rely only on static state parameters and instructions that do not rely on state information at all will not be affected by a state variable. In some embodiments, the majority of instructions are of this type.

Accordingly, issue logic 424 may be configured with various logic circuits that decode the instruction to any extent necessary to determine whether the instruction would be affected by a particular state variable. Those skilled in the art will recognize that where fewer state variables are allowed, simpler logic circuits may be used to make the determination at step 804. For instance, in one embodiment, issue logic 424 includes a table that is populated (e.g., during system initialization) with a list of possible dynamic state parameters. Each possible dynamic state parameter is associated with a list of instructions whose execution may be affected by changes in that dynamic state parameter. Based on information extracted from state storage area 512 as to which state parameters are dynamic for a particular SIMD group, issue logic 424 refers to the table to determine which instructions may be affected. Each received instruction can thus be evaluated on a group-specific basis to determine whether it might be affected by a change in a dynamic state variable.

If it is determined at step 804 that execution of the instruction will not be affected by a state variable, then at step 806, the instruction is scheduled for parallel execution. In parallel execution, the instruction is issued once and executed by all threads in the SIMD group for which execution is appropriate. (As described above with reference to FIG. 4, in some instances, some of the threads may be masked off for reasons not related to state variables.)

If, however, it is determined at step 804 that execution of the instruction will be affected by a state variable, then at step 810, a further determination is made as to whether multiple instances of the state variable are present in the dynamic state packet 604 associated with the SIMD group. In some embodiments, step 810 includes reading the count parameter 608 in dynamic state packet 604 (see FIG. 6) to determine the number of instances.

If only one instance of the state variable is present, then all threads can still be executed in parallel, and process 800 proceeds to step 806 to schedule the threads for parallel execution as described above. If, however, multiple instances are present, then process 800 schedules the instruction for serialized execution (step 812).

In one embodiment, serialized execution is accomplished by issuing the instruction multiple times, with the number of times being determined by the number of instances of the state variable. In each instance of issuing the instruction, a different instance of the state variable is used, and the bit mask associated with that instance of the state variable is used as an active mask to control which threads do or do not execute the instruction in that instance.

In another embodiment, serialized execution can be accomplished by signaling the appropriate functional unit(s) in processing engines 402 (see FIG. 4) to execute multiple iterations of the instruction, using a different instance of the state variable and a different active mask each time.

In either case, the issue logic advantageously allows for the extra clock cycles required to execute the instruction multiple times and delays issue of subsequent instructions as needed.

It will be appreciated that the scheduling algorithm described herein is illustrative and that variations and modifications are possible. Steps described as sequential may be executed in parallel, order of steps may be varied, and steps may be modified or combined. The scheduling algorithm of FIG. 8 may be used in conjunction with other scheduling algorithms (including conventional algorithms) to determine when to issue an instruction.

Further Embodiments

The embodiments described above support emulation of multiple-state multiple data behavior (with SIMD instruction issue) in a single-state multiple-data architecture through selective serialization of instruction execution in instances where the different states associated with different threads in the SIMD group can affect instruction execution. It is believed that such an approach will tend to increase the average actual SIMD group size for a given application without additional complex hardware that would be required to support parallel reading of multiple instances of state information.

Any state parameter or combination of state parameters may be managed as a dynamic state parameter. In some embodiments, the number of dynamic state parameters is relatively small (e.g., one, two, or three), simplifying the determination as to which instructions will be affected by changes in a dynamic state parameter. For a particular implementation, empirical analysis may be useful in selecting one or a few state parameters where dynamic management provides the greatest benefit to operating efficiency and/or throughput. As described above, in some embodiments, state information for a given SIMD group may be limited to including multiple values (or instances) for only one dynamic state parameter, and the dynamic state parameter for a given SIMD group may be whichever state parameter changes first after the loading of the group begins. In other embodiments, the state information may include multiple values for multiple dynamic state parameters.

The effect of selectively serialized execution of a SIMD group as described herein on overall throughput of core 310 is expected to vary depending on the particular program being executed and the frequency of state changes within SIMD groups. In some cases, the state variable affects relatively few of the program instructions; since most instructions can execute for all threads of the SIMD group in parallel, selective serialization of group execution may have a negligible effect on throughput. In other cases, the state variable affects a large fraction of the program instructions, and selective serialization may measurably reduce throughput as compared to fully parallel execution. It should be noted, however, that for SIMD processors that support only a single state per SIMD group, the alternative to selectively serializing execution in the event of multiple instances of a state variable is to split the SIMD group into two groups, which in effect serializes execution of the group for every instruction, generally reducing throughput to a greater degree than selective serialization. Thus, managing multiple instances of a state variable within a single SIMD group can almost always be expected to provide at least some benefit.

It should also be noted that the efficiency advantages gained by managing multiple instances of a state variable within a SIMD group are expected to scale with the maximum width of a SIMD group. As SIMD groups are made wider, the likelihood of a state update occurring while a new SIMD group is only partially populated will tend to increase. If each state update requires launching a partially populated SIMD group, the fraction of executing groups that are only partially populated will tend to increase with the maximum width of the SIMD group, leading to more unused processing cycles and more inefficiency as SIMD width increases.

While the invention has been described with respect to specific embodiments, one skilled in the art will recognize that numerous modifications are possible. For instance, while the invention has been described with reference to a multi-threaded SIMD processing core that can concurrently execute multiple SIMD groups, the invention can also be practiced in a processor that uses SIMD instruction issue but is not multithreaded.

The bit mask referred to in embodiments described above is usable to define a subset of the threads of the SIMD group (referred to herein as a SIMD subset) associated with each instance of the state variable. In alternative embodiments, SIMD subsets can be defined using structures other than bit masks.

Further, while embodiments described above may make reference to pixels, quads, attributes of primitives and other terminology specific to instances where the SIMD group is used to execute pixel shaders, it is to be understood that the invention is not limited to pixel processing. Those skilled in the art will recognize that the state management techniques described herein may be adapted to other types of state information associated with other types of processing tasks, including but not limited to other types of graphics-related processing tasks (such as vertex and/or geometry shaders) as well as general-purpose computation tasks. For instance, vertex shaders may be subject to relatively frequent changes in various processing constants (e.g., vertex transformation parameters), and selective serialization can also improve vertex shader throughput. Such techniques may be used in any processor with SIMD issue capability, including graphics processors, other special purpose processors, and general-purpose processors such as CPUs.

Thus, although the invention has been described with respect to specific embodiments, it will be appreciated that the invention is intended to cover all modifications and equivalents within the scope of the following claims.

What is claimed is:

1. A method for processing data in a parallel processor, the method comprising:
defining a single-instruction, multiple-data (SIMD) group comprising a plurality of threads to execute a same program in parallel, wherein the SIMD group includes a first subset of threads associated with a first instance of a state variable and a second subset of threads associated with a second instance of the state variable;
launching the SIMD group on a same clock cycle so that the SIMD group begins in a synchronized state;
receiving a series of instructions of the program to be executed for each thread of the SIMD group; and
for each instruction of the series that is received:
determining whether the state variable affects execution of the instruction;
in the event that the state variable does not affect execution of the instruction, executing the instruction in parallel for all of the threads of the SIMD group; and
in the event that the state variable affects execution of the instruction:
executing the instruction in parallel for all of the threads of the first subset using the first instance of the state variable; and
executing the instruction in parallel for all of the threads of the second subset using the second instance of the state variable,
wherein execution of the instruction for the threads of the second subset is serial relative to execution of the instruction for the threads of the first subset.

2. The method of claim 1 wherein:
executing the instruction in parallel for all of the threads of the first subset includes issuing the instruction in association with the first instance of the state variable for execution by the first subset; and
executing the instruction in parallel for all of the threads of the second subset includes issuing the instruction in association with the second instance of the state variable for execution by the second subset after issuing the instruction for execution by the first subset.

3. The method of claim 1 wherein the act of defining the SIMD group includes:
providing a state packet that includes the first and second instances of the state variable; and
identifying, in the state packet, the threads of the SIMD group that are in the first subset or the second subset.

4. The method of claim 3 wherein the act of identifying the threads of the SIMD group that are in the first subset or the second subset includes:
associating an instance of a bit mask with each instance of the state variable in the state packet, wherein each thread in the SIMD group corresponds to one of a plurality of bits in the bit mask; and
setting the bits in the bit mask to indicate which of the threads are associated with the instance of the state variable that is associated with the bit mask.

5. The method of claim 3 wherein the act of defining the SIMD group further includes:
receiving input data to be processed by threads of the SIMD group; and
loading the input data into an input buffer.

6. The method of claim 5 wherein the input data for different threads is received sequentially and wherein the act of defining the SIMD group further includes:
subsequent to receiving input data for a first one of the threads and prior to receiving input data for a second one of the threads, detecting a change in the state variable from the first value to the second value; and
in response to detecting the change, adding a new instance of the state variable to the state packet.

7. The method of claim 6 further comprising:
detecting a change in a static state parameter; and
in response to the detected change, launching the SIMD group prior to updating the state packet to reflect the change in the static state parameter.

8. A processor comprising:
a plurality of processing engines configured to execute a SIMD group comprising a plurality of threads to execute a same program in parallel, each one of the processing engines being associated with a different one of the plurality of threads, wherein the SIMD group includes a first subset of threads associated with a first instance of a state variable and a second subset of threads associated with a second instance of a state variable; and a core interface coupled to issue logic the core interface configured to launch the SIMD group on a same clock cycle so that the SIMD group begins in a synchronized state;

the issue logic coupled to the plurality of processing engines, the issue logic configured to issue one instruction in parallel to the processing engines, wherein each processing engine executes the instruction for the associated one of the plurality of threads of the SIMD group, the issue logic including a scheduler configured to determine whether the state variable affects execution of the instruction to be issued, wherein the scheduler is further configured to schedule the instruction for parallel execution by all of the processing engines in the event that the state variable does not affect execution of the instruction and, in the event that the state variable does affect execution, to schedule the instruction for parallel execution by the processing engines associated with threads in the first subset of threads and for parallel execution by the processing engines associated with threads in the second subset of threads, wherein execution of the instruction for the threads in the second subset is serial relative to execution of the instruction for the threads in the first subset.

9. The processor of claim 8 wherein the issue logic is further configured to issue multiple instances of each instruction scheduled for serial execution for the threads of the second subset relative to the threads of the first subset, each instance of the instruction being associated with a different one of the instances of the state variable.

10. The processor of claim 8 further comprising:
a state storage area configured to store a plurality of state packets that contain values of state parameters for the SIMD group, wherein the state packets include:
a static state packet configured to store a static state parameter that is the same for all of the threads of the SIMD group; and
a dynamic state packet configured to store one or more instances of the state variable.

11. The processor of claim 10 further comprising:
thread packing logic configured to load input data for the threads of the SIMD group into a processing core, thereby making the input data for each one of the threads accessible to the processing engine associated with that thread, and further configured to detect and process updates to state parameters including the state variable.

12. The processor of claim 11 wherein the thread packing logic is further configured to add a new instance of the state variable to the dynamic state packet in the event of an update to the state variable.

13. The processor of claim 11 wherein the thread packing logic is further configured to detect and process updates to the static state parameter and wherein processing updates to the static state parameter includes launching the SIMD group prior to updating the static state parameter.

14. The processor of claim 8 wherein each thread in the SIMD group of threads executes a pixel shader program.

15. The processor of claim 8 wherein each thread in the SIMD group of threads executes a vertex shader program.

16. The processor of claim 14 further comprising:
a shared memory coupled to the processing engines and configured to store attribute coefficients for a primitive to be processed using the pixel shader program,
wherein the state variable is a reference to a location in the shared memory.

* * * * *